US011804979B2

(12) United States Patent
Park

(10) Patent No.: US 11,804,979 B2
(45) Date of Patent: Oct. 31, 2023

(54) CONTROL DEVICE, VEHICLE HAVING THE CONTROL DEVICE, AND METHOD FOR CONTROLLING THE CONTROL DEVICE

(71) Applicants: HYUNDAI MOTOR COMPANY, Seoul (KR); KIA MOTORS CORPORATION, Seoul (KR)

(72) Inventor: Pilyong Park, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 248 days.

(21) Appl. No.: 17/157,147

(22) Filed: Jan. 25, 2021

(65) Prior Publication Data
US 2022/0038303 A1  Feb. 3, 2022

(30) Foreign Application Priority Data
Jul. 31, 2020 (KR) .................. 10-2020-0096281

(51) Int. Cl.
H04L 12/40 (2006.01)
B60R 25/24 (2013.01)
H04W 84/02 (2009.01)
H04W 4/80 (2018.01)

(52) U.S. Cl.
CPC ...... H04L 12/40039 (2013.01); B60R 25/241 (2013.01); B60R 25/245 (2013.01); H04W 4/80 (2018.02); H04W 84/02 (2013.01); B60R 2325/103 (2013.01); H04L 2012/40273 (2013.01)

(58) Field of Classification Search
CPC ... H04W 52/0245; H04W 4/40; H04W 12/63; H04W 52/0229; H04W 52/0241; H04W 84/02; H04W 4/80; H04W 12/06; H04W 52/0274; H04L 12/40039; H04L 12/12; H04L 67/12; H04L 2012/40273; B60R 25/241; B60R 25/245; B60R 2325/103; B60R 25/24; Y02D 30/70
See application file for complete search history.

(56) References Cited

U.S. PATENT DOCUMENTS 9,845,070 B2* 12/2017 Petel .................. B60R 25/246
11,242,031 B2* 2/2022 Han .................... B60R 25/245
2018/0246508 A1* 8/2018 Choi ...................... G07C 9/00
2019/0118736 A1* 4/2019 Bessho ................ H04L 12/5601
2019/0254095 A1* 8/2019 Eriksen ............. G07C 9/00857
2021/0304535 A1* 9/2021 Studerus ............ G07C 9/00309
2022/0417898 A1* 12/2022 Kim ...................... H04W 88/06

* cited by examiner

Primary Examiner — Oussama Roudani
(74) Attorney, Agent, or Firm — LEMPIA SUMMERFIELD KATZ LLC

(57) ABSTRACT

In one form of the present disclosure, vehicle includes: a plurality of electronic devices; a first communication device configured to communicate with a terminal using a first communication method; a second communication device configured to communicate with the terminal using a second communication method; and a control device configured to wake up the plurality of electronic devices when the first communication device wakes up, switch the plurality of electronic devices to a sleep mode when the first communication device is switched to the sleep mode, and selectively control the wake up and the sleep modes of the second communication device based on a message received from the terminal.

6 Claims, 10 Drawing Sheets

CONTROL DEVICE, VEHICLE HAVING THE CONTROL DEVICE, AND METHOD FOR CONTROLLING THE CONTROL DEVICE

CROSS-REFERENCE TO RELATED APPLICATION(S)

This application claims priority to and the benefit of Korean Patent Application No. 10-2020-0096281, filed on Jul. 31, 2020, the entire contents of which are incorporated herein by reference.

FIELD

The present disclosure relates to a control device for authenticating a digital key, a vehicle having the same, and a control method of the control device.

BACKGROUND

The statements in this section merely provide background information related to the present disclosure and may not constitute prior art.

A vehicle can be locked or unlocked by a key or a remote controller, and the engine can also be turned on or off.

A remote controller performs two-way communication with the vehicle so that the driver can open the door or trunk by automatically unlocking the door of the vehicle when it is close to the vehicle without requiring separate manual operation, and also allows the vehicle to be started when the ignition button is operated without manually starting the vehicle while driving.

Recently, control technologies that enable communication between a vehicle and a terminal have been developed. Accordingly the user can use the terminal to control the door opening and closing, door locking and starting of the vehicle.

When communication between the vehicle and the terminal is connected in this way, the vehicle can be remotely controlled using the terminal. At this time, a plurality of controllers and electronic devices provided in a vehicle that can be remotely controlled by a terminal wake up, thereby increasing the amount of power consumed in the vehicle.

SUMMARY

The present disclosure wake up some communication devices and electronic devices at the same time or control them to sleep mode, and selectively wake up some communication devices or control them to sleep mode.

In one form of the present disclosure, a vehicle may include a plurality of electronic devices; a first communication device configured to perform communication with a terminal in a first communication method; a second communication device configured to perform communication with the terminal in a second communication method; and a control device configured to control a wake up of the plurality of electronic devices when the first communication device wakes up, control a switch of the plurality of electronic devices to a sleep mode when the first communication device is switched to the sleep mode, and selectively control the wake up and the sleep modes of the second communication device based on a message received from the terminal.

The control device may be configured to perform authentication of the terminal, and transmit a control command received from the terminal to at least one of the plurality of electronic devices upon successful authentication of the terminal.

The at least one of the plurality of electronic devices may include a third communication device for performing communication with the terminal in a third communication method, and the control device may be configured to perform wake up when a tagging signal is received from the second communication device wile in a sleep mode.

The control device may configure an OSEK (Open Systems and their Interfaces for the Electronics in Motor Vehicles) Network management cluster with the plurality of electronic devices and the first communication device, and configure a partial networking cluster with the second communication device.

The second communication device may be configured to include a plurality of ultra-wideband communication devices, each including a partial networking transceiver and performing ultra-wideband communication, and the control device may be configured to selectively control the wake up and sleep mode of the plurality of ultra-wideband communication devices.

When the at least one of the devices constituting the OSEK network management cluster wakes up, the remaining devices may also wake up, and when the at least one of the devices constituting the OSEK network management cluster switches to a sleep mode, the remaining devices may also switch into the sleep mode.

The control device may be configured to acquire distance information corresponding to the signal reception strength information received by the first communication device, and determine whether the distance to the terminal exceeds a reference distance based on the acquired distance information and the reference distance information, and control the sleep mode of the second communication device when it is determined that the distance to the terminal exceeds the reference distance.

The control device may be configured to switch control the first communication device to a sleep mode when the second communication device is switched to the sleep mode.

The control device may be configured to switch control the second communication device to a sleep mode when it is determined that the terminal cannot communicate through the second communication method.

In one form of the present disclosure, a control device may include a memory configured to store identification information of a terminal; and a processor configured to perform authentication of the terminal based on the identification information of the terminal. The terminal may comprise a plurality of electronic device, a blue-tooth communication device, and a short-range wireless communication device (NFC) and a first cluster, and comprise a plurality of ultra-wideband communication devices and a second cluster. The plurality of electronic devices may be devices that perform an operation corresponding to a control command transmitted from the terminal, and at least one of the blue-tooth communication device, the short-range wireless communication device (NFC), or the plurality of ultra-wideband communication devices may be configured to perform communication with the terminal.

The first cluster may be OSEK (Open Systems and their interfaces for the electronics in Motor Vehicles) network management cluster, and the second cluster may be a partial networking cluster.

The processor may be configured to control a wake up of the plurality of electronic devices, the blue-tooth communication device, and the short-range wireless communication device (NFC) when current state is an wake up state, and switch control of the plurality of electronic devices, the blue-tooth communication device, and the short-range wireless communication device (NFC) when the current state is in the sleep mode.

The processor may be configured to determine whether the plurality of ultra-wideband communication devices and the terminal desire communication and control the wake up of the plurality of the ultra-wideband communication device when it is determined that communication with the terminal is necessary.

The processor may be configured to acquire distance information corresponding to the signal reception strength information received by the blue-tooth communication device, and determine whether the distance to the terminal exceeds a reference distance based on the acquired distance information and the reference distance information, and control the sleep mode of the plurality of ultra-wideband device when it is determined that the distance to the terminal exceeds the reference distance.

The processor may be configured to switch the Bluetooth communication device to the sleep mode when the plurality of ultra-wideband communication devices are switched to the sleep mode.

The processor may be configured to control the sleep mode of the plurality of ultra-wideband communication devices when it is determined that the terminal cannot communicate through the ultra-wideband communication method.

In one form of the present disclosure, a controlling method of control device transmitting received control command from a terminal to a plurality of electronic devices, the method may comprise controlling wake up of the plurality of electronic devices, a blue-tooth communication device when current state is a wake up state, performing authentication of the terminal, controlling the plurality of electronic devices, the blue-tooth communication device to a sleep mode when the current state is a sleep mode, determining whether a plurality of ultra-wideband communication devices and the terminal desire communication, and controlling the wake up of the plurality of ultra-wideband communication devices when it is determined that communication with the terminal is desired.

The method may further comprise acquiring distance information corresponding to the signal reception strength information received by the blue-tooth communication device, determining whether the distance to the terminal exceeds a reference distance based on the acquired distance information and the reference distance information, and controlling the sleep mode of the plurality of ultra-wideband device when it is determined that the distance to the terminal exceeds the reference distance.

The method may further comprise switching the blue-tooth communication device to a sleep mode when the plurality of ultra-wideband communication devices are switched to the sleep mode.

The method may further comprise waking-up when a tagging signal is received from a short-range wireless communication device provided in any one of the plurality of electronic devices when the current state is in the sleep mode.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
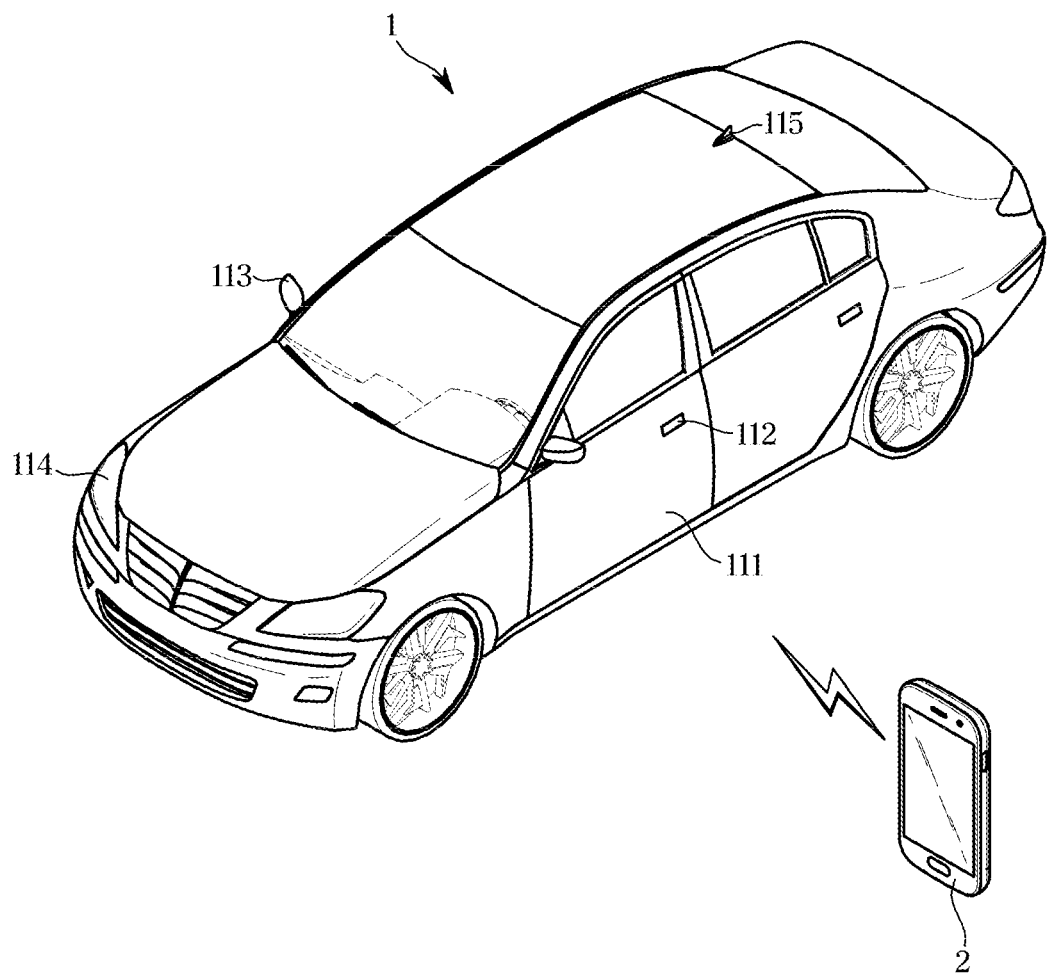
FIG. 1 is an exemplary diagram of a vehicle and a terminal according to one form of the present disclosure.

The statements in this section merely provide background information related to the present disclosure and may not constitute prior art.

DETAILED DESCRIPTION

The following description is merely exemplary in nature and is not intended to limit the present disclosure, application, or uses. It should be understood that throughout the drawings, corresponding reference numerals indicate like or corresponding parts and features.

This specification does not describe all elements of the exemplary forms of the present disclosure and detailed descriptions on what are well known in the art or redundant descriptions on substantially the same configurations may be omitted. The term 'part, module, member, block' used in the specification may be implemented in software or hardware, and a plurality of 'part, module, member, block' may be embodied as one component. It is also possible that one 'part, module, member, block' includes a plurality of components.

Throughout the specification, when an element is referred to as being "connected to" another element, it may be directly or indirectly connected to the other element and the "indirectly connected to" includes being connected to the other element via a wireless communication network.

In addition, when a part is said to "include" a certain component, this means that it may further include other components, except to exclude other components unless otherwise stated.

Throughout the specification, when a member is located "on" another member, this includes not only when one member is in contact with another member but also when another member exists between the two members.

The terms first, second, etc. are used to distinguish one component from another component, and the component is not limited by the terms described above.

Singular expressions include plural expressions unless the context clearly indicates an exception.

In each step, the identification code is used for convenience of description, and the identification code does not describe the order of each step. Each of the steps may be performed out of the stated order unless the context clearly dictates the specific order.

Hereinafter, with reference to the accompanying drawings will be described the working principle and various forms of the present invention.

FIG. 1 is an exemplary diagram of a vehicle and a terminal according to one form of the present disclosure.

The vehicle 1 includes a body having an interior and an exterior, and a chassis in which a mechanical device desired for driving is installed in the rest of the body except for the vehicle body.

As shown in FIG. 1, the exterior 110 of the vehicle body includes a front panel, a bonnet, a roof panel, a rear panel, a trunk in which luggage is loaded, a front and rear door 111, and a window glass provided to open and close the front and rear doors.

The front, rear, left and right doors 111 may be provided with handles 112 that can be held by a user to facilitate opening and closing of the door. The handle 112 may have a shape protruding outward from the surface of the door 111. In addition, the handle 112 may be provided to be inserted into the door 111 and withdrawn to the outside of the door 111.

The exterior of the vehicle body includes a side mirror 113 that provides a driver with a view from the rear of the vehicle 1, and a plurality of lamps 114 that allow the driver to easily see information around the vehicle while looking at the front view.

The side mirror 113 may perform an unfolding or folding operation in response to a startup on-off operation.

At least one of the plurality of lamps 114 may perform a lighting or blinking operation in response to receiving a door lock and unlock command through the terminal 2.

The plurality of lamps 114 may perform not only a lighting function, but also a signal and communication function for other vehicles and pedestrians.

The vehicle may further include an antenna 115 for performing communication with a terminal and an external device.

The antenna 115 may be provided on a roof panel, may be provided on a rear windshield glass, may be provided on a door, or may be provided on one of a front panel and a rear panel.

The interior of the vehicle body includes a seat on which the occupant sits; dashboard; a cluster (i.e., instrument panel) arranged on the city board and guiding driving functions and vehicle information such as vehicle speed, engine speed, fuel flow, and coolant; and a center fascia with control panel of air conditioner.

The seat is a chair on which the occupant can sit, and includes a driver's seat on which the driver sits and a passenger seat provided next to the driver's seat, and may further include a rear seat provided at the rear of the driver's seat and the passenger seat in which the passenger may sit.

The vehicle is provided on the center fascia and may include a head unit for controlling an audio device, an air conditioner, a Bluetooth device, and a seat heating wire.

The center fascia head unit may be provided with an input (see 121 in FIG. 2) for receiving a user input, and a display (122 in FIG. 2) that displays operation information on at least one of the functions performed in the vehicle.

The input (see 121 in FIG. 2) may include a hardware device such as various buttons or switches, pedals, keyboards, mice, track-balls, various levers, handles, sticks, etc.

In addition, the input (see 121 in FIG. 2) may include a graphical user interface (GUI) such as a touch pad, that is, a device that is software. The touch pad may be implemented as a touch screen panel (TSP) to form a layer structure with the display panel of the display.

The interior of the vehicle body may include a key way into which a fob type or card type remote controller (not shown) can be inserted. Here, the key way may be provided on the dashboard or the center fascia, but may be provided in a position adjacent to the driver's seat.

The vehicle can transmit and receive information with the remote controller or terminal 2 when the remote controller is inserted into the keyway or authentication with the remote controller or terminal 2 is completed through a wireless communication network.

The vehicle may further include a charging unit for wirelessly charging the terminal 2.

The interior of the vehicle body may further include a start button for receiving an on/off command for starting the vehicle. Accordingly, the vehicle is turned on when the ignition button is pressed by the user after authentication with the remote controller or the terminal 2 is completed.

The vehicle may further include a communicator (140 of FIG. 2) for transmitting and receiving information with at least one of a plurality of electronic devices, a plurality of controllers, a remote controller, or a terminal 2 provided in the vehicle.

The communicator (140 in FIG. 2) may include one or more components that enable communication between components inside the vehicle, and for example, may include at least one of a short-range communication module, a wired communication module, or a wireless communication module.

The short-range communication module may include various short-range communication modules that transmit and receive signals using a wireless communication network at a short distance such as Bluetooth module, infrared communication module, RFID (Radio Frequency Identification) communication module, WLAN (Wireless Local Access Network) communication module, NFC communication module, Zigbee communication module.

The wired communication module may include various cable communication modules such as Controller Area Network (CAN) communication module, Local Area Network (LAN) module, Wide Area Network (WAN) module or Value Added Network (VAN) module, etc., as well as various wired communication modules such as Universal Serial Bus (USB), High Definition Multimedia Interface (HDMI), Digital Visual Interface (DVI), recommended standard232 (RS-232), power line communication, or plain old telephone service (POTS), etc.

The wired communication module may further include a Local Interconnect Network (LIN).

The wireless communication module may include a wireless communication module supporting various wireless communication methods such as Wifi module and Wireless broadband module, global system for mobile communication (GSM), Code Division Multiple Access (CDMA), universal mobile telecommunications system (UMTS), TDMA (Time Division Multiple Access (LTE), Ultra Wide Band (UWB) etc.

The wireless communication module may further include a wireless charging module that communicates with a Wireless Power Consortium (WPC) standard to wirelessly charge the terminal. The wireless charging module of the WPC standard can allow the terminal to be charged in a magnetic induction method.

The terminal 2 communicates with the vehicle, and receives at least one of a lock and unlock command of the door 111, a lock and unlock command of the tail gate, a start command, a lighting command or a start command of the lamp 114 as a user input, and transmits information corresponding to the received command to the vehicle 1. The terminal 2 may transmit information corresponding to the received command to the vehicle as a communication signal.

Here, the computer includes, for example, a laptop equipped with a web browser, a desktop, a laptop, a tablet PC, a slate PC, and the like, and the portable terminal may include all kinds of handheld based wireless communication devices guaranteed portability and mobility such as PCS (Personal Communication System), GSM (Global System for Mobile communications), PDC (Personal Digital Cellular), PHS (Personal Handyphone System), PDA (Personal Digital Assistant), International Mobile Telecommunication (IMT)-2000, Code Division Multiple Access (CDMA)-2000, W-Code Division Multiple Access (W-CDMA), WiBro (Wireless Broadband Internet) terminal, such as a smart phone, or wearable devices such as head-mounted-devices (HMDs), watches, rings, bracelets, anklets, necklaces, glasses, contact lenses.

The terminal receives a registration command and registration authentication information as a digital key.

The terminal receives at least one of a communication connection attempt command with the vehicle, a door lock command, a door unlock command, a tail gate lock command, a tail gate unlock command, a start command, or a lamp lighting command.

The terminal may display door lock completion or failure information corresponding to the door lock command, or display the door unlocking completion or failure corresponding to the door unlocking command, or in response to the lighting command sent to the vehicle, the terminal may display lamp lighting completion or lamp lighting failure, or display the remaining time until the lamp goes out.

The terminal may store identification information of the vehicle when terminal registration completion information is received from the vehicle.

When the terminal performs the function of the digital key of the vehicle after the terminal registration is completed, the terminal attempts communication connection with the vehicle.

The terminal 2 of the present form may communicate with a vehicle through at least one of a Bluetooth Low Energy (BLE) module, an Ultra Wide Band (UWB) module, or a Near Field Communication (NFC) module.

Figure 2:
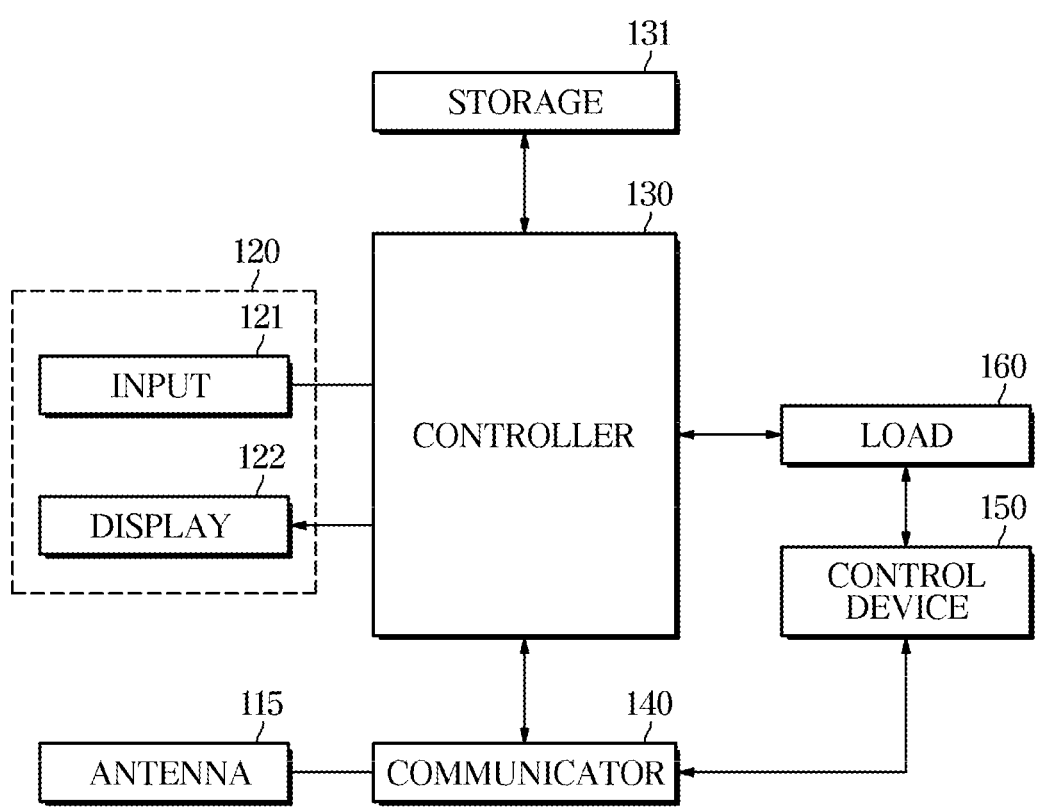
FIG. 2 is a block diagram of a vehicle control according to one form of the present disclosure.

FIG. 2 is a block diagram of a vehicle control according to one form of the present disclosure.

The vehicle 1 includes an input 121, a display 122, a controller 130, a storage 131, a communicator 140, a control device 150, and a load 160.

The input 121 receives operation commands for various functions that can be performed in the vehicle 1.

The input 121 may receive a door lock and unlock command.

The input 121 receives a registration command from the terminal 2.

The input 121 may receive identification information of the terminal 2, and may receive registration authentication information transmitted to the terminal when the terminal 2 is registered by the user.

Here, the terminal 2 registered in the vehicle can function as a digital key of the vehicle, that is, a remote controller. The terminal 2 may include an application (i.e., an app) for performing a digital key function of a vehicle.

The input 121 may include a start button that receives a start command for starting an engine or driving a motor from a user, and receives a start-off command from the user when stopping. The display 122 displays information on functions being performed in the vehicle and information input by the user.

The display 122 displays information on the registration process of the terminal, and displays registration success information or registration failure information of the terminal in response to the registration result. The display 122 may also display identification information of the registered terminal.

The display 122 displays information on the authentication process with the terminal 2 when communication is attempted with the terminal 2, and displays authentication success or authentication failure information of the terminal 2 corresponding to the authentication execution result. The display 122 may also display identification information of the terminal for which authentication was successful.

Here, the input and the display may be implemented as a touch screen.

The input and the display of the vehicle may be provided as an input and a display of the vehicle terminal 120. Here, the vehicle terminal 120 may be a terminal (AVN) that performs audio, video, and navigation functions.

The controller 130 performs overall control of vehicle driving.

The controller 130 may control an operation corresponding to a user input received at the input 121 and control operation information of various functions performed in the vehicle to be displayed.

The controller 130 may control operations of various electronic devices and various controllers provided in the load 160 in response to a user input received at input 121 and control communication with an external device (not shown). Here, the external device may include a server, an infrastructure, a user terminal, or another vehicle.

When performing communication with the terminal 2, the controller 130 controls the operation of at least one electronic device or controller based on a control command in the information transmitted from the terminal 2, thereby performing a function corresponding to the received information in the vehicle.

The controller 130 controls the communicator 140 to transmit and receive information between various electronic devices provided in the vehicle, and controls the communicator 140 to transmit and receive information between various controllers provided in the vehicle.

The controller 130 communicates with the control device 150 and recognizes a communication connection state with the terminal 2 through communication with the control device 150.

When it is determined that user authentication is successful in the control device 150, the controller 130 may control activation or allow control of various electronic devices and controllers in the vehicle.

If the control device 150 determines that user authentication has failed, the controller 130 may control deactivation of various electronic devices and controllers in the vehicle, or may limit control.

The controller 130 can be implemented with one processor.

The controller 130 may be implemented by a memory (not shown) that stores data on an algorithm for controlling the operation of the components in the vehicle or a program that reproduces the algorithm, and a processor (not shown) that performs the above-described operation using data stored in the memory). In this case, the memory and the processor may be implemented as separate chips, respectively. Alternatively, the memory and processor may be implemented as a single chip.

The storage 131 stores identification information of the terminal.

The storage 131 stores at least one of an authentication code, a shared key, or an encryption key.

The storage 131 may be implemented by a nonvolatile memory device such as cache, read only memory (ROM), programmable ROM (PROM), erasable programmable ROM (EPROM), electrically erasable programmable ROM (EPMROM), and flash memory or a volatile memory device such as RAM or a storage medium such as HDD (Hard Disk Drive), or CD-ROM, but is not limited thereto.

The storage 131 may be a memory implemented as a separate chip from the processor described above with respect to the controller 130, or may be implemented as a processor and a single chip.

The storage 131 may be provided in the control device 150.

The communicator 140 communicates with an external device through the antenna 115. Here, the external device may include at least one of a server, an infrastructure, another vehicle, or a terminal 2.

The communicator 140 may perform at least one of Bluetooth communication, ultra-broadband communication, or NFC communication with a terminal that functions as a smart key (or digital key). That is, the communicator 140 includes a first communication device 141 performing Bluetooth communication, a second communication device 142 performing ultra-wideband communication, and a third communication device 143 (143a, 143b) performing NFC communication.

The communicator 140 may transmit authentication information for authentication and vehicle identification information to the terminal 2 in response to a control command of the control device 150.

The communicator 140 transmits the information transmitted from the terminal 2 to at least one of the controller 130 or the control device 150.

The communicator 140 also performs communication between internal components.

The control device 150 controls communication with the terminal 2 to enable communication with the terminal 2 that performs the function of a digital key. The control device 150 may be a device that authenticates a user through terminal authentication. That is, the control device 150 may be an Identity Authentication Unit (IAU).

The control device 150 may authenticate the terminal based on the terminal signal received from at least one of a first communication device 141 for performing communication using a Bluetooth communication method, which is a first communication method, a second communication device 142 performing communication in a broadband communication method, which is a second communication method, or a signal from a terminal received through at least one of a third communication device 143a, 143b that performs communication through a third communication method, the NFC communication method.

The control device 150 searches for a communication capable terminal 2 when a registration command for terminal registration is received, and transmits registration authentication information for authentication to the searched terminal 2, and when the registration authentication information is received through input 121, the control device 150 compares the received registration authentication information with the transmitted registration authentication information. When the received registration authentication information and the transmitted registration authentication information are the same, the control device 150 registers the searched terminal 2 as the terminal 2 for performing the function of a digital key.

When a plurality of terminals are found, the control device 150 transmits different registration authentication information to the plurality of terminals, When any one of the registration authentication information is received through input 121, the control device 150 checks the same registration authentication information as the received registration authentication information among the transmitted registration authentication information. The control device 150 may register the terminal 2 with the verified registration authentication information matched as the terminal 2 for performing the function of a digital key.

The control device 150 may store identification information of the terminal that has transmitted the received registration authentication information in the storage 131 and control the display 122 so that the identification information of the registered terminal 2 is displayed.

The control device 150 may store identification information of the terminal that has transmitted the received registration authentication information in the storage 131 and control the display 122 so that the identification information of the registered terminal 2 is displayed.

When the control device 150 registers a terminal to perform the function of a digital key, information for authentication of the terminal 2 and communication connection with the terminal 2 is transmitted to the terminal 2.

When searching for the terminal 2, the control device 150 checks signal reception strength information and identification information of the received terminal for signals received by at least one of the communication devices in the communicator 140, checks received signal strength information that is greater than or equal to the reference signal reception strength among the received signal reception strengths based on the received signal reception strength information and the reference signal reception strength information, and searches for the terminal 2 having the confirmed received signal strength information.

That is, the control device 150 may perform authentication of the searched terminal within a communication distance for each communication device.

When a connection signal is received from the terminal 2, the control device 150 may compare the identification information of the registered terminal with the identification information of the communication-connected terminal to determine whether the terminal transmitting the connection signal and the registered terminal are the same.

Here, the at least one electronic device or controller may be a device or controller that performs a function of a digital key. In addition, if the identification information of the registered terminal and the identification information of the terminal connected through communication are different from each other, the control device 150 may reject or suspend a control command of the terminal connected through communication.

When a communication connection signal is received from the terminal 2, the control device 150 acquires distance information from the terminal 2 based on the transmission power in the packet and the strength of the signal received signal transmitted from the terminal 2, determines whether the distance to the terminal 2 is less than the reference distance based on the obtained distance information and the reference distance information. When it is determined that the distance to the terminal 2 is less than the reference distance, the control device 150 controls the operation of at least one electronic device based on the information transmitted from the terminal 2, and when it is determined that the distance to the terminal 2 exceeds the reference distance, the control device 150 may suspend or reject operation control of at least one electronic device corresponding to the information transmitted from the terminal 2. Here, the at least one electronic device may be a device that performs a function of a digital key.

When the control device 150 fails to control the operation of at least one electronic device corresponding to the information transmitted from the terminal 2, the control device 150 may transmit operation control failure information to the terminal 2, and when the distance to the terminal 2 exceeds the reference distance, the control device 150 may transmit information on the reference distance exceeded to the terminal 2.

The control device may transmit user information to the controller 130 when the user is authenticated through communication with the terminal. At this time, vehicle entry and startup may be made possible by the control of the controller 130. In addition, when the user is authenticated through communication with the terminal, the control device 150 may wake up the load so that the digital key function can be controlled.

That is, when it is determined that the user authentication is successful through the terminal 2, the control device 150 may control activation of electronic devices of the load unit in response to a digital key function, and may control activation of various communication devices of the communication unit. Here, the activation control may include wake-up control.

The control device 150 may communicate with a plurality of electronic devices that perform a digital key function. The control device 150 may communicate with a plurality of communication devices that perform the function of digital keys.

The control device may be implemented by an algorithm for performing the function of user authentication and digital key, or a memory (M) for storing data for a program that reproduces the algorithm, and a processor P that performs the above-described operation using data stored in the memory. In this case, the memory and the processor may be implemented as separate chips, respectively. Alternatively, the memory and the processor may be implemented as a single chip.

The control device may further include a communication interface for transmitting and receiving signals with other devices.

In the control device, at least one component may be added or deleted in response to user authentication and functions of the digital key. In addition, it will be readily understood by those of ordinary skill in the art that the mutual positions of the components may be changed corresponding to the performance or structure of the system.

The plurality of electronic devices of the load 160 may include, for example, first, second, and third electronic devices.

The first electronic device 161 may include a charging unit that performs wireless charging.

The charging unit allows the terminal 2 to be charged by a magnetic induction method.

The charging unit enables communication with the terminal while charging the terminal using the WPC communication method, and when the communication with the terminal is successfully performed, the starting device can be activated. That is, when the start button is turned on while communication with the terminal is possible through the charging unit, a control command for starting may be transmitted to a starting device such as an engine or a motor.

The second and third electronic devices 162, 163 are provided on the handle 112 of the left and right doors, and may include first and second door handle devices that lock and unlock the left and right doors 111.

The second and third electronic devices 162, 163 are provided on the handle 112 of the left and right doors, and may include first and second door handle devices that lock and unlock the left and right doors 111.

When a user is authenticated and a door open command is received from the terminal 2 in a wake-up state, the second and third electronic devices 162, 163 may control the unlocking of the door, and may control the lock of the door when a door closing command is received from the terminal.

When the handle provided on the door is a handle that is automatically drawn in and withdrawn, the second and third electronic devices 162, 163 control the door to be unlocked when a door opening command is received from the terminal 2, and may control the handle to be withdrawn. Also, when a door closing command is received from the terminal 2, the second and third electronic devices 162, 163 may control the lock of the door and control the handle to be withdrawn.

The vehicle may include at least one of a motor or an engine that applies driving force to the wheel as a starting device. For example, when a start-on command is received from the terminal 2, the vehicle operates the starter motor, and when the start-off command is received, the engine stops operation.

At least one component may be added or deleted corresponding to the performance of the components of the vehicle shown in FIG. 2. In addition, it will be readily understood by those of ordinary skill in the art that the mutual positions of the components may be changed corresponding to the performance or structure of the system.

Meanwhile, each component shown in FIG. 2 refers to software and/or hardware components such as a Field Programmable Gate Array (FPGA) and an Application Specific Integrated Circuit (ASIC).

Figure 3:
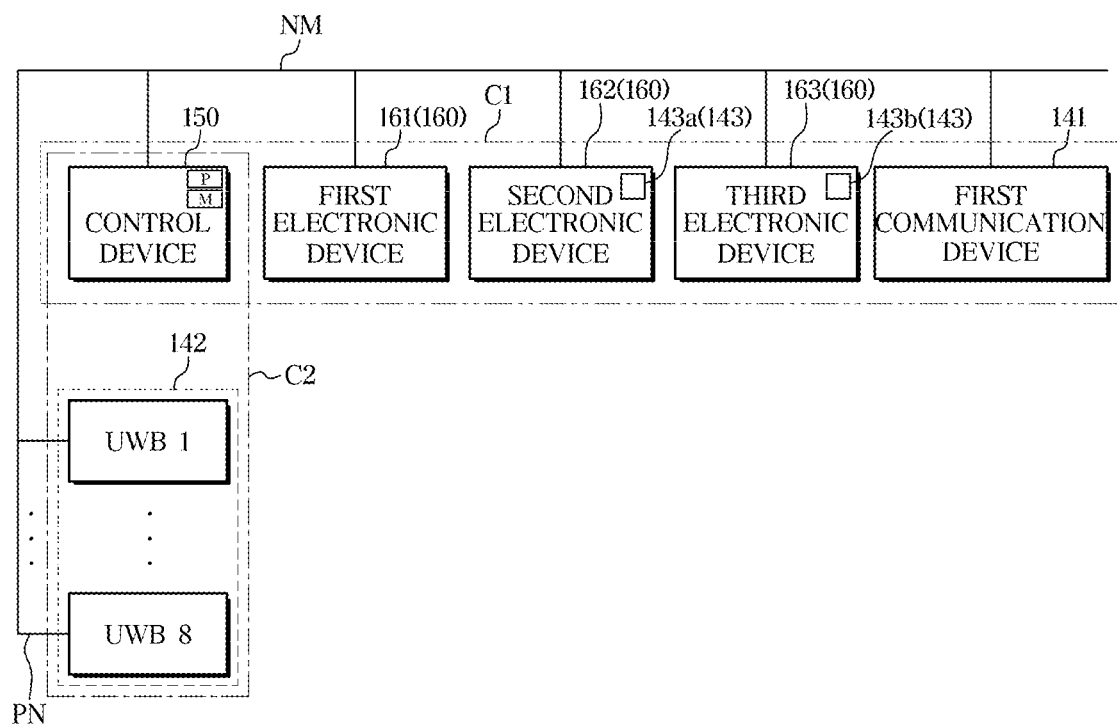
FIG. 3 is an exemplary diagram of a network configuration between a plurality of electronic devices and a plurality of communication devices provided in a vehicle according to one form of the present disclosure.

FIG. 3 is an exemplary diagram of a network configuration between a plurality of electronic devices and a plurality of communication devices provided in a vehicle according to one form of the present disclosure.

The vehicle may include a control device for performing the function of a digital key and a plurality of electronic devices, and may include a plurality of communication devices.

For example, a plurality of electronic devices for performing the function of digital keys include a first electronic device including a charging unit, and second and third electronic devices including first and second door handle devices for locking and unlocking the left and right doors 111.

The first communication device 141 may include a Bluetooth communication device that performs low-power Bluetooth (BLE) communication with a terminal.

The control device, the plurality of electronic devices, and the first communication device 141 may include a normal transceiver, and may constitute a first cluster C1 that is an OSEK network management cluster.

The normal transceiver may be a transceiver supporting normal wake-up.

A transceiver supporting normal wakeup may be a transceiver that senses a pulse value and performs wakeup based on the detected pulse value.

A normal wakeup is when one device in the OSEK (Open Systems and their Interfaces for the Electronics in Motor Vehicles) network management cluster wakes up, the rest of the devices wake up. For example, when the first electronic device wakes up, the second and third electronic devices and the first communication device constituting the OSEK network management cluster also wake up.

The normal transceiver may be a transceiver that allows the rest of the devices to enter the sleep mode when any one device constituting the OSEK network management cluster enters the sleep mode. For example, when the first electronic device enters the sleep mode, the general transceiver of the first electronic device may transmit a sleep command to the second and third electronic devices constituting the OSEK network management cluster and the general transceiver of the first communication device.

The second communication device 142 includes an ultra-wideband communication device that performs ultra-wideband communication. The second communication device 142 may include a plurality of ultra-wideband communication devices.

The plurality of ultra-wideband communication devices may include partial networking transceivers.

Here, the plurality of ultra-wideband communication devices are not managed by the network management (NM) environment. In other words, multiple ultra-wideband communication devices are not subject to OSEK network management.

The control device 150 and a plurality of ultra-wideband communication devices may form a second cluster C2. Here, the second cluster may be a partial networking cluster.

The control device 150 functions as a master device in a partial networking cluster. The control device 150 may control wake-up of at least one ultra-wideband communication device among a plurality of ultra-wideband communication devices constituting a partial networking cluster, or switch at least one ultra-wideband communication device to a sleep mode.

The partial networking transceiver may be a transceiver that wakes up a microcomputer by filtering only valid messages among received messages.

The partial networking transceiver may be a transceiver that switches the microcomputer to a sleep mode when a sleep command is received from the control device 150, which is a master device.

The plurality of communication devices of the communication unit may have different communication distances with the terminal. Accordingly, an area capable of communicating with the terminal may be different.

Figure 4:
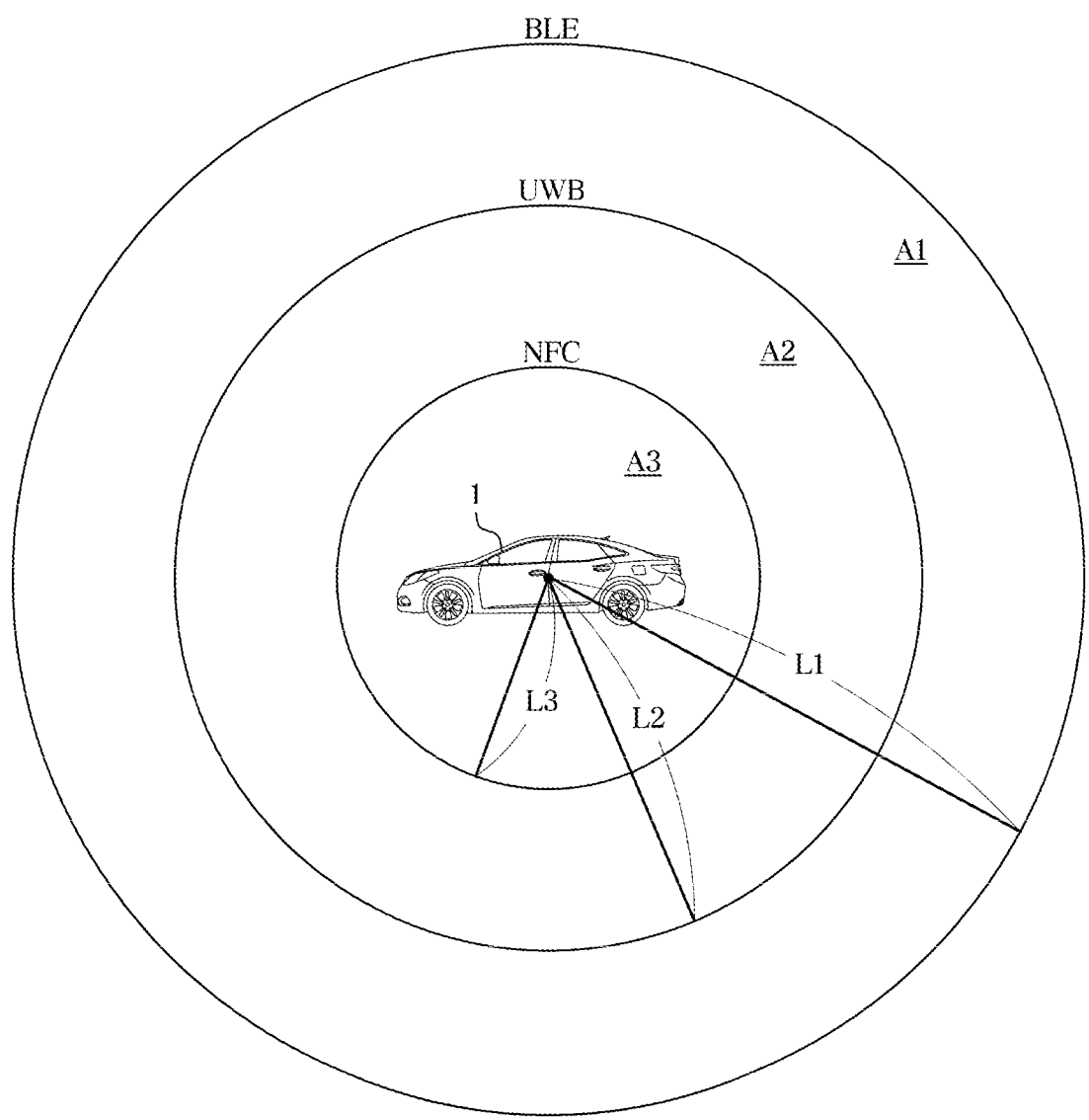
FIG. 4 is an exemplary diagram of a communication available area of a plurality of communication devices provided in a vehicle according to one form of the present disclosure.

As shown in FIG. 4, the first communication device may communicate with the terminal 2 existing in the first area A1 having the first reference distance L1 as a radius, the second communication device may communicate with the terminal 2 existing in the second area A2 having the second reference distance L2 as a radius, the third communication device may communicate with the terminal 2 existing in the third area. A3 having the third reference distance L3 as a radius.

The first reference distance may be longer than the second reference distance, and the second reference distance may be longer than the third reference distance.

The first region may include first and second regions, and the second region may include the first region.

The vehicle may perform communication with the terminal at a greater distance when communicating with the terminal through a Bluetooth communication device, which is the first communication device, than when performing communication with the terminal using the second and third communication devices.

A communication control configuration between each device including a first cluster and a second cluster in a vehicle will be described with reference to FIGS. 5 to 8.

Figure 5:
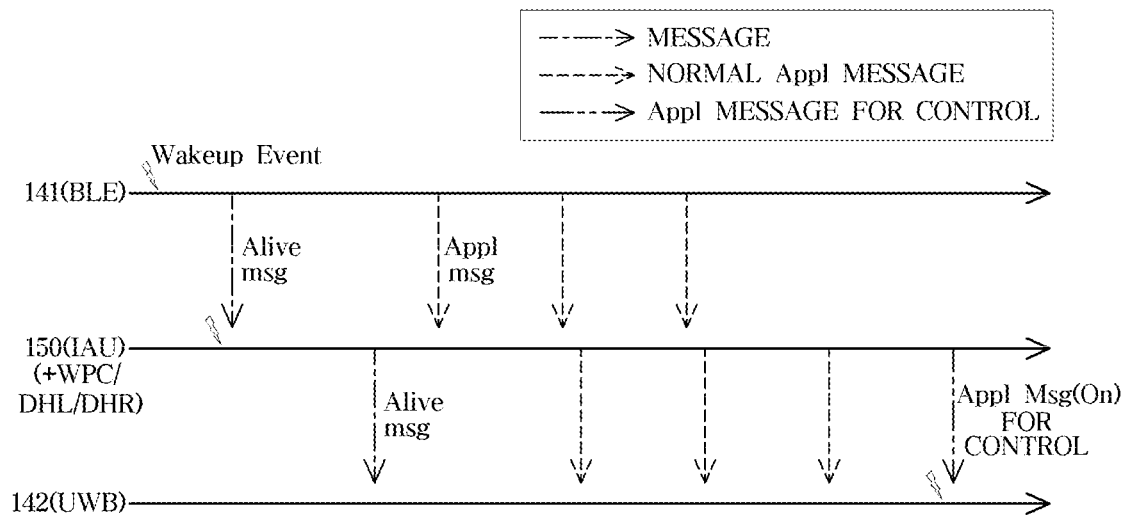
FIGS. 5 to 8 are diagrams illustrating control of wake-up and sleep modes between a control device provided in a vehicle and first, second, and third communication devices according to one form of the present disclosure.

As shown in FIG. 5, the first communication device 141, BLE performs a wakeup when a signal for a wakeup event transmitted from the terminal is received, sends an alive message (Alive msg) to control device 150, IAU when it is determined that the distance to the terminal is adjacent to the first reference distance based on distance information and reference distance information corresponding to signal reception strength information of a received signal (Wakeup Event). The first communication device 141, BLE transmits the received normal application message (Appl msg) to the control device 150, IAU when a normal application message (Appl msg) for performing a digital key function is received from the terminal, but, may sequentially transmit a general application message (Appl msg) sequentially received to the control device 150, IAU.

Here, determining that the distance to the terminal 2 is adjacent to the first reference distance (or the reference distance) includes determining that the distance to the terminal is a long distance.

The control device 150, IAU performs wake-up when an alive message (Alive msg) is received from the first communication device 141. In this case, a plurality of electronic devices 161, 162, 163 constituting the first cluster C1 together with the control device 150, IAU may also wake up.

In addition, the control device 150, IAU may perform user authentication through terminal authentication after performing wake-up, and may transmit an alive message to the second communication device when user authentication is successful.

In addition, when an alive message (Alive msg) is received from the first communication device, the control device 150, IAU transmits an alive message (Alive msg) to the second communication device 142.

The control device 150, IAU receives a normal application message (Appl msg) from the first communication device, transmits the received general application message (Appl msg) to the second communication device 142, and may sequentially transmit a normal application message (Appl msg) sequentially received to the second communication device 142.

The control device 150, IAU checks at least one ultra-wideband communication device corresponding to the received alive message (Alive msg), and transmits the control application message (Appl msg(on)) to at least one identified ultra-wideband communication device.

The control device 150, IAU checks the time desired to control at least one ultra-wideband communication device, and by transmitting the confirmed application message (Appl msg(on)) to the at least one ultra-wideband communication device at the identified desired time point, the at least one ultra-wideband communication device may wake up at the desired time point.

In addition, each of the ultra-wideband communication devices determines whether the received application message (Appl msg(on)) is a valid message for itself, and may wake-up in response to a received application message (Appl msg(on)) when it is determined that the message is valid for itself.

Figure 6:
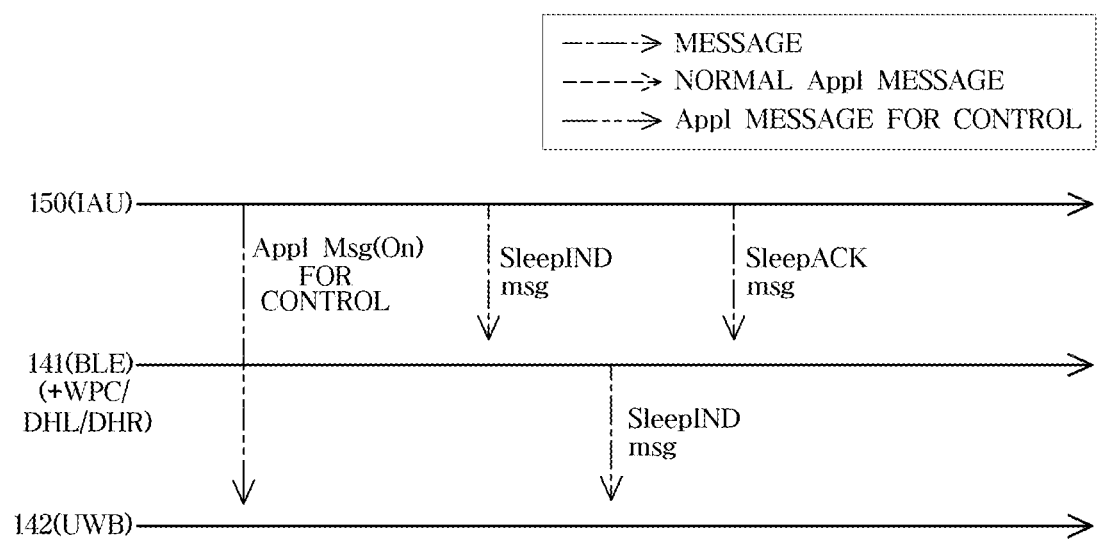

As shown in FIG. 6, When it is determined that the distance to the terminal exceeds the reference distance based on distance information and reference distance information corresponding to the received signal reception strength information, the first communication device may transmit the user's departure information to the control device.

When it is determined that communication with at least one ultra-wideband communication device is not desired in response to the reception of the user's departure information, the control device 150, IAU transmits an application message (Appl msg(Off)) to the at least one ultra-wideband communication device so that the at least one ultra-wideband communication device switches to a sleep mode.

At this time, each of the ultra-wideband communication devices determines whether the received application message (Appl msg(off)) is a valid message for itself, and each of the ultra-wideband communication devices may switch to the sleep mode in response to a received application message (Appl msg(off)) when it is determined that the message is valid for itself.

The control device may transmit a sleep command message (Sleep IND msg) to the first communication device 141 and then transmit a sleep confirmation message (Sleep Ack msg) to the first communication device.

The control device transmits a sleep command message (Sleep IND msg) to the first, second, and third electronic devices constituting the first cluster as well as the first communication device 141, and then sends a sleep confirmation message (Sleep Ack msg).

In addition, since the first, second, and third electronic devices 161, 162, 163 form the same first cluster as the first communication device, the first communication device may switch to the sleep mode together as the first communication device switches to the sleep mode.

The control device 150, IAU may transmit an application message (Appl Msg (Off)) to the ultra-wideband communication device before transmitting the sleep command message (Sleep IND Msg) to the first communication device.

When a sleep command message (Sleep IND msg) is received, the first communication device may transmit the received sleep command message (Sleep IND msg) to the ultra-wideband communication device as the second communication device.

A case in which super wideband communication is not supported in the terminal will be described with reference to FIGS. 7 and 8.

Figure 7:
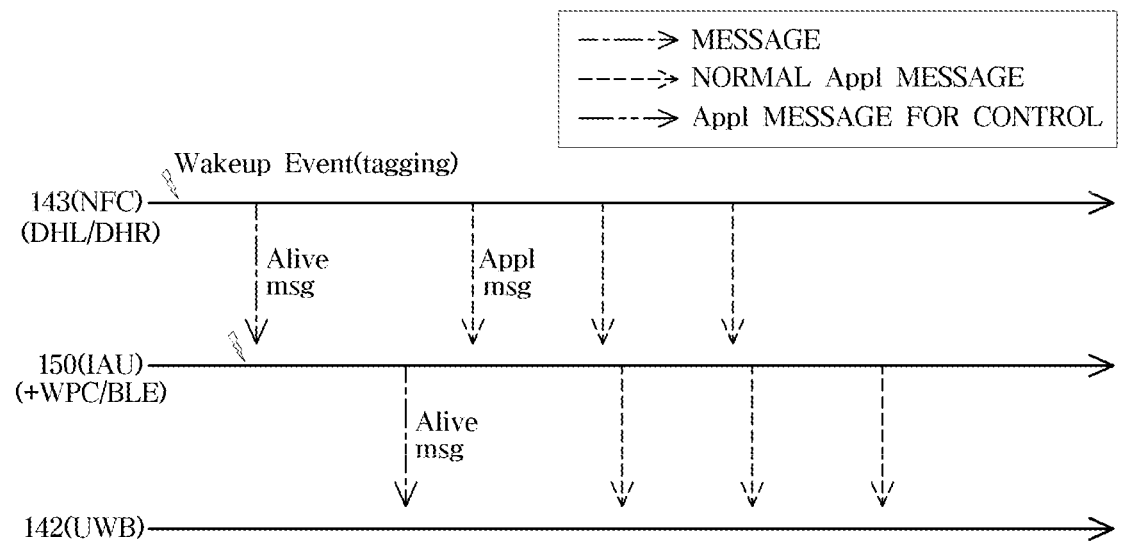

As shown in FIG. 7, when it is determined that Bluetooth is off because the terminal and Bluetooth communication are not connected, the vehicle determines whether or not the third communication device 143 is connected to communication.

Whether the third communication device 143 is connected to communication includes determining an NFC communication connection by NFC tagging.

Whether the third communication device 143 is connected to communication may include determining that the distance to the terminal is within the third reference distance.

The third communication device 143, NFC wakes up when a signal by tagging with the terminal 2 is received, and transmits an alive message (Alive msg) to the control device 150, IAU, and transmits the received normal application message (Appl msg) to the control device 150, IAU when a normal application message (Appl msg) for performing a digital key function is received from the terminal. But, the third communication device 143, NFC may sequentially transmit a general application message (Appl msg) sequentially received to the control device 150, IAU.

The control device 150, IAU performs wake-up when an alive message (Alive msg) is received from the third communication device 143. In this case, a plurality of electronic devices 161, 162, 163 constituting the first cluster C1 together with the control device 150, IAU may also wake up.

In addition, the control device 150, IAU may perform user authentication through terminal authentication after performing wake-up, and may transmit an alive message to the second communication device when user authentication is successful.

The control device 150, IAU receives a normal application message (Appl msg) from the third communication device 143, transmits the received normal application message (Appl msg) to the second communication device 142, may sequentially transmit a general application message (Appl msg) sequentially received to the second communication device 142.

The control device 150, IAU determines whether the terminal supports ultra-wideband communication, and controls the second communication device so that the second communication device is maintained in the sleep mode when it is determined that the terminal does not support ultra-wideband communication. That is, the second communication device maintains the sleep mode.

In addition, the control device 150, IAU may block transmission of an alive message or a normal application message (Appl msg).

Figure 8:
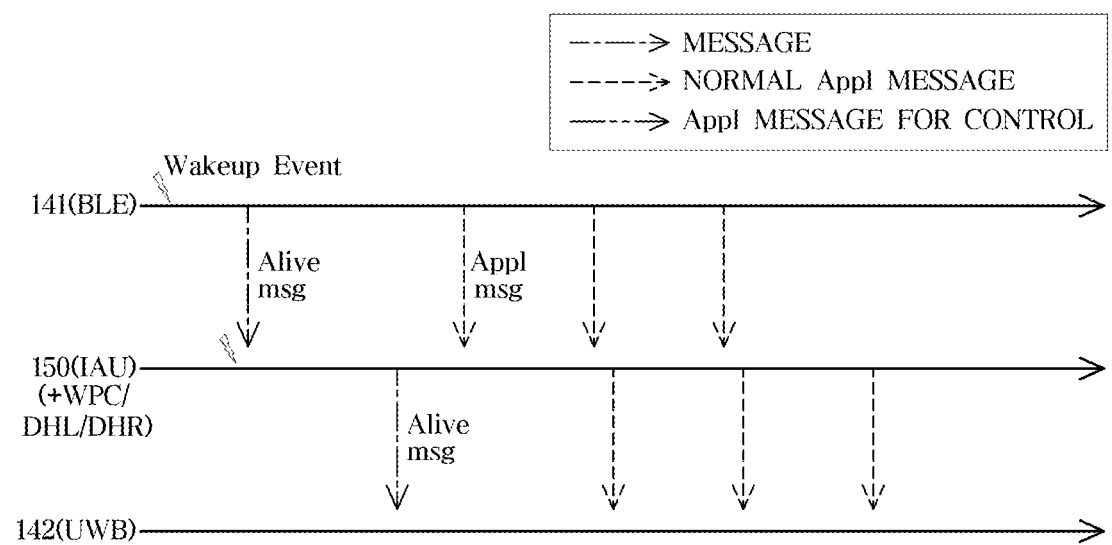

As shown in FIG. 8, when the first communication device 141, BLE is connected to the terminal and Bluetooth communication, it is determined that the Bluetooth of the terminal is turned on.

In addition, the first communication device wakes up when a signal for a wakeup event transmitted from the terminal is received, sends alive message (Alive msg) to the control device 150, IAU when it is determined that the distance to the terminal is adjacent to the first reference distance based on distance information and reference distance information corresponding to signal reception strength information of a received signal (Wakeup Event). The first communication device transmits the received normal application message (Appl msg) to the control device 150, IAU when a normal application message (Appl msg) for performing a digital key function is received from the terminal thereafter, and may sequentially transmit the sequentially received normal application message (Appl msg) to the control device 150, IAU.

The control device 150, IAU performs wake-up when an alive message (Alive msg) is received from the first communication device 141. In this case, a plurality of electronic devices 161, 162, 163 constituting the first cluster C1 together with the control device 150, IAU may also wake up.

In addition, the control device 150, IAU may perform user authentication through terminal authentication after performing wake-up, and may transmit an alive message to the second communication device if user authentication is successful.

In addition, when an alive message (Alive msg) is received from the first communication device, the control device 150, IAU transmits an alive message (Alive msg) to the second communication device 142.

The control device 150, LAU receives a normal application message (Appl msg) from the first communication device, transmits the received normal application message (Appl msg) to the second communication device 142, and may sequentially transmit a normal application message (Appl msg) that is secondly received to the second communication device 142.

The control device 150, IAU determines whether the terminal supports ultra-wideband communication, and controls the second communication device so that the second communication device is maintained in the sleep mode when it is determined that the ultra-wideband communication is not supported at the end. That is, the second communication device maintains the sleep mode.

In addition, the control device 150, IAU may block transmission of an alive message or a normal application message (Appl msg).

Figure 9:
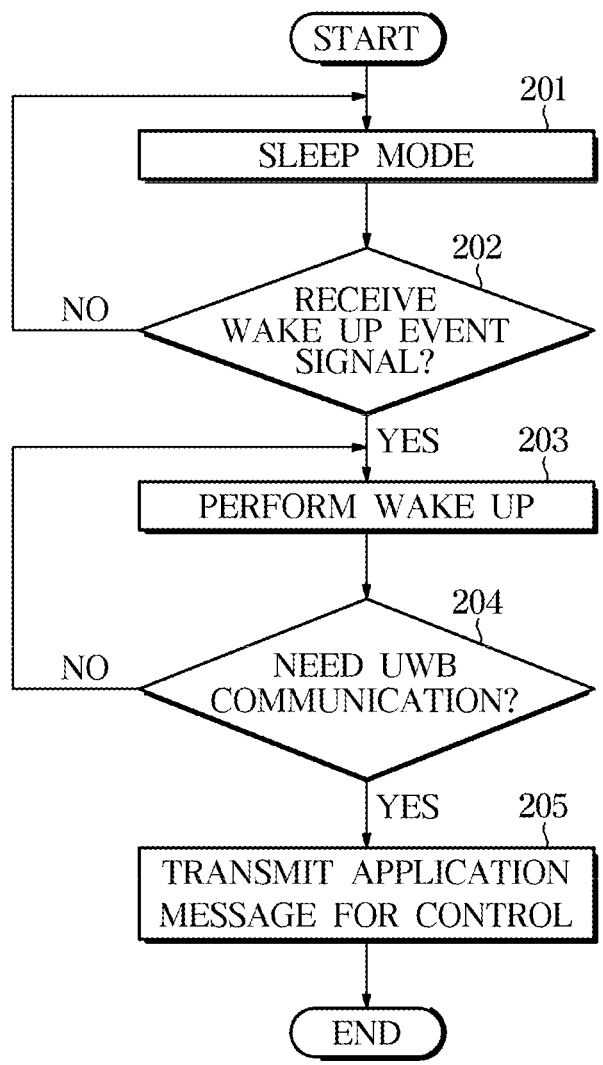
FIG. 9 is a control flow chart of a control device provided in a vehicle according to one form of the present disclosure, and a flow chart of wake-up control of a second communication device.

FIG. 9 is a control flow chart of a control device provided in a vehicle according to one form of the present disclosure, and a flow chart of wake-up control of a second communication device.

When the control device receives 202 a wakeup event transmitted from the terminal while performing the sleep mode 201, the control device wakes up (203).

Here, the signal for the wake-up event may be received through the first communication device or the third communication device.

When a signal for a wake-up event is received through the first communication device, a plurality of electronic devices 161, 162, 163 constituting the first cluster C1 together with the control device 150, IAU will also wake up.

When a signal for a wake-up event is received through a third communication device, the first electronic device 161 and the first communication device 141 constituting the first cluster C1 together with the control device 150, IAU may also wake up.

The control device 150, IAU may perform user authentication through terminal authentication after wake-up is performed.

The control device 150, IAU may transmit a normal application message (Appl msg) for performing a digital key function to the plurality of electronic devices 161, 162, 163 when user authentication is successful.

The control device 150, IAU may ignore transmission of a normal application message (Appl msg) for performing a digital key function if user authentication fails.

The control device 150, IAU determines whether ultra-wideband communication (UWB) with at least one of the plurality of ultra-wideband communication devices is desired (204), the control device 150, IAU may transmit 205 a control application message (Appl msg(on)) to at least one ultra-wideband communication device when it is determined that communication with at least one ultra-wideband communication device is desired.

More specifically, the control device 150, IAU identifies at least one ultra-wideband communication device desiring ultra-wideband communication among a plurality of ultra-wideband communication devices based on the received alive message (Alive msg) or normal application message (Appl msg), and may transmit a control application message (Appl msg(on)) to at least one identified super wideband communication device. At this time, the at least one ultra-wideband communication device may wake up in response to reception of the control application message (Appl msg (on)).

In this way, the control device 150, IAU checks the desired time to control at least one ultra-wideband communication device, transmits the confirmed application message (Appl msg(on)) to at least one ultra-wideband communication device at the time desired to be recognized, so that at least one ultra-wideband communication device wakes up at the desired time.

Figure 10:
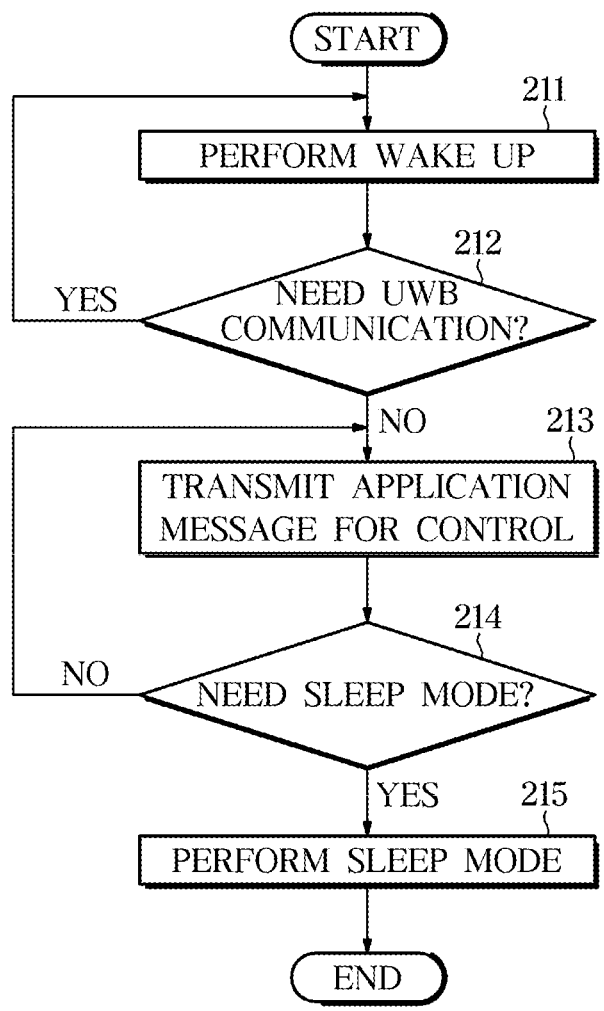
FIG. 10 is a control flow chart of a control device provided in a vehicle according to one form of the present disclosure, and a flow chart of control of a sleep mode of a second communication device.

FIG. 10 is a control flow chart of a control device provided in a vehicle according to one form of the present disclosure, and a flow chart of control of a sleep mode of a second communication device.

The control device 150, IAU determines whether ultra-wideband communication (UWB) with at least one ultra-wideband communication device among a plurality of ultra-wideband communication devices is desired while the current state is awakened (211) (212). When it is determined that communication with at least one ultra-wideband communication device is not desired, the control device 150, IAU may transmit 213 an application message for control (Appl msg(off)) to at least one ultra-wideband communication device.

At this time, at least one ultra-wideband communication device may switch to the sleep mode in response to reception of the control application message (Appl msg(off)).

The control device 150, IAU determines whether it is desired to switch to the sleep mode (215), and if it is determined that the switch to the sleep mode is desired, performs the sleep mode (215). In this case, the control device 150 (IAU), the plurality of electronic devices 161, 162, 163 constituting the first cluster, and the first communication device 141 may also perform the sleep mode.

The non-transitory computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although a few exemplary forms of the present disclosure have been shown and described, it would be appreciated by those skilled in the art that changes may be made in these exemplary forms without departing from the principles and spirit of the disclosure, the scope of which is defined in the claims and their equivalents.

The present disclosure can support partial networking in an OSEK network management environment and control a sleep mode.

That is, the present disclosure can selectively turn on/off a Bluetooth communication device or an ultra-wideband communication device in an OSEK network management environment based on the control of a digital key authentication controller. Accordingly, the present disclosure can minimize the power consumed in the communication device.

The present disclosure can implement partial networking without all the in-vehicle controllers or electronic devices using AUTOSAR NM.

Since the present disclosure can be implemented only by changing software without changing hardware, it is possible to prevent cost incurred due to hardware addition and manufacturing.

As described above, the present disclosure can improve the quality and marketability of a vehicle, and further improve user convenience and vehicle safety, and secure product competitiveness.

What is claimed is:

1. A vehicle, comprising:
   a plurality of electronic devices;
   a first communication device configured to communicate with a terminal for remotely controlling the vehicle using a first communication method;
   a second communication device configured to communicate with the terminal using a second communication method; and
   a control device configured to:
      form an Open Systems and their Interfaces for the Electronics in Motor Vehicles (OSEK) Network management (NM) cluster with the plurality of electronic devices and the first communication device,
      form a partial network (PN) with the second communication device,
      control an authentication of the terminal,
      wake-up and receive a message from the terminal, and
      transmit the received message to the second communication device,
   wherein the second communication device is configured to, when the message is received from the control device,
      determine whether the received message is a valid message, and
      when it is determined that the received message is the valid message, control a wake-up mode or a sleep mode of the second communication device based on the valid message,
   wherein
      when at least one electronic device among the plurality of electronic devices and the control device in the OSEK NM cluster are switched to the sleep mode by the first communication device, remaining devices in the OSEK NM cluster are switched to the sleep mode, and
      when at least one device among the plurality of electronic devices and the control device in the OSEK NM cluster are switched to the wake-up mode by the first communication device, the remaining devices in the OSEK NM cluster are switched to the wake-up mode, and
   wherein the control device is configured to, when the second communication device is switched to the sleep mode, control the sleep mode of the plurality of electronic devices and the first communication device in the OSEK NM cluster.

2. The vehicle according to claim 1, wherein the control device further is configured to transmit a control command received from the terminal to at least one electronic device of the plurality of electronic devices upon successful authentication of the terminal.

3. The vehicle according to claim 1, wherein:
   the vehicle further comprises a third communication device configured to communicate with the terminal using a third communication method, and
   the control device is configured to wake up when a tagging signal is received from the third communication device while in the sleep mode.

4. The vehicle according to claim 1, wherein:
   the second communication device includes a plurality of ultra-wideband communication devices,
   each ultra-wideband communication device of the plurality of ultra-wideband communication devices includes a partial networking transceiver and is configured to perform ultra wideband communication, and
   the control device is configured to selectively control the wake up mode and the sleep mode of the plurality of ultra wideband communication devices.

5. The vehicle according to claim 1, wherein the control device is configured to:
   acquire distance information corresponding to a signal reception strength information received by the first communication device,
   determine whether a distance to the terminal exceeds a reference distance based on the acquired distance information and a reference distance information, and
   control the sleep mode of the second communication device when it is determined that the distance to the terminal exceeds the reference distance.

6. The vehicle according to claim 1, wherein the control device is configured to switch the second communication device to the sleep mode when it is determined that the terminal cannot communicate through the second communication method.

* * * * *